(12) United States Patent  
Kogure

(10) Patent No.: US 8,175,797 B2
(45) Date of Patent: May 8, 2012

(54) VEHICLE DRIVE ASSIST SYSTEM

(75) Inventor: Masaru Kogure, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 431 days.

(21) Appl. No.: 12/568,121

(22) Filed: Sep. 28, 2009

(65) Prior Publication Data

US 2010/0082251 A1   Apr. 1, 2010

(30) Foreign Application Priority Data

Sep. 30, 2008   (JP) .................. 2008-254157

(51) Int. Cl.
*B60Q 1/00* (2006.01)
*G06F 19/00* (2006.01)

(52) U.S. Cl. .............. 701/301; 701/300; 340/435
(58) Field of Classification Search ............ 701/301, 701/300, 92; 340/435, 903
See application file for complete search history.

(56) References Cited

U.S. PATENT DOCUMENTS

| | | | |
|---|---|---|---|
| 5,699,040 A * | 12/1997 | Matsuda | 340/435 |
| 6,571,176 B1 | 5/2003 | Shinmura et al. | |
| 7,734,416 B2 * | 6/2010 | Yano et al. | 701/301 |
| 7,885,766 B2 * | 2/2011 | Sugimoto et al. | 701/301 |
| 2007/0080825 A1 * | 4/2007 | Shiller | 340/903 |

FOREIGN PATENT DOCUMENTS

JP   2000-357299   12/2000

* cited by examiner

*Primary Examiner* — Tan Q Nguyen
(74) *Attorney, Agent, or Firm* — Smith, Gambrell & Russell, LLP

(57) ABSTRACT

A form of a travel path of an oncoming vehicle is recognized based on white-line data. A speed component of the oncoming vehicle with respect to the travel path (route) is calculated by weighting a lateral speed component orthogonal to the route and a lateral speed component following the route, with a speed correction coefficient which is set in accordance with a relative distance between a subject vehicle and the oncoming vehicle. A change in behavior of the oncoming vehicle is predicted, and a possibility of collision against the subject vehicle is determined. If it is determined that there is a possibility of collision, an alarm is output to alert a driver to the possibility of collision.

7 Claims, 4 Drawing Sheets

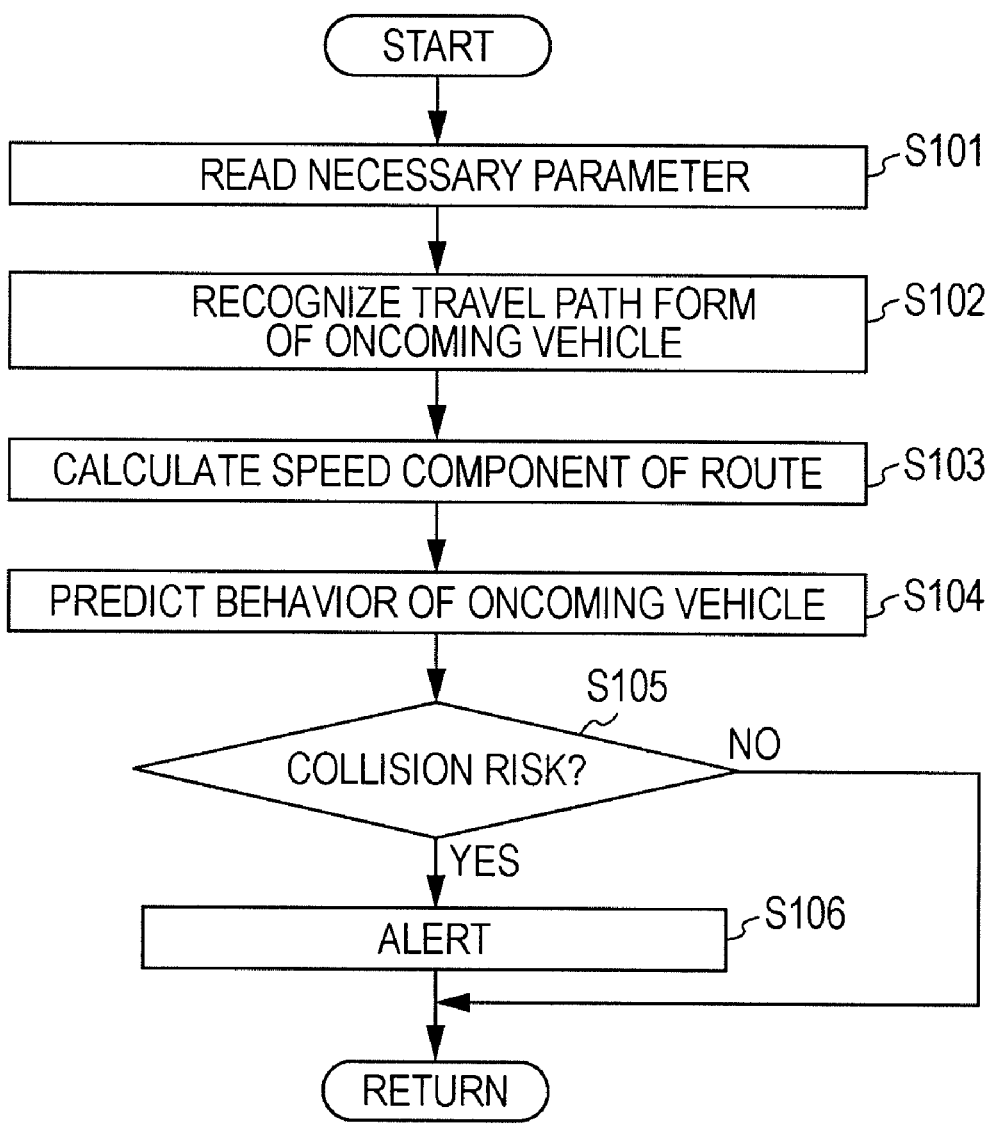

VEHICLE DRIVE ASSIST SYSTEM

CROSS REFERENCE TO RELATED APPLICATIONS

The disclosure of Japanese Patent Application No. 2008-254157 filed on Sep. 30, 2008 including the specification, drawings and abstract is incorporated herein by reference in its entirety.

BACKGROUND OF THE INVENTION

1. Field of the Invention

The present invention relates to a vehicle drive assist system which provides drive assist for a driver by recognizing surrounding environment of a subject vehicle.

2. Description of the Related Art

In recent years, a technique has been developed and put into the practical use, the technique which recognizes a three-dimensional object, such as an obstruction or a front vehicle, by detecting external surrounding environment of a vehicle such as an automobile, with a camera or a laser radar mounted on the vehicle, and which provides drive assist control of, for example, alerting, automatic braking, and automatic steering to prevent collision, thereby increasing the safety.

With such a drive assist control, collision is typically predicted based on relative positions of a subject vehicle and an obstruction, and speed information of the subject vehicle. Using the prediction result, the alerting and control for preventive safety are provided. For example, Japanese Unexamined Patent Application Publication No. 2000-357299 discloses a technique which predicts a position at which a subject vehicle collides with an oncoming vehicle, based on a relative positional relationship between the subject vehicle and the oncoming vehicle, and a vehicle speed of the subject vehicle.

A sensor for recognizing surrounding environment of the subject vehicle typically uses a stereo camera, a millimeter wave radar, a laser radar, etc. Unfortunately, a speed detection accuracy of such a sensor is insufficient in a lateral direction. It is difficult to highly accurately predict a possibility of collision between the subject vehicle and a movable body such as an oncoming vehicle, with the technique of related art disclosed in Japanese Unexamined Patent Application Publication No. 2000-357299. Hence, erroneous alerting and control may likely occur.

SUMMARY OF THE INVENTION

In light of the above-described situations, an object of the present invention is to provide a vehicle drive assist system capable of providing proper drive assist by accurately predicting a behavior of a movable body and correctly determining a possibility of collision.

To attain this, a vehicle drive assist system according to an aspect of the present invention provides drive assist for a driver by recognizing surrounding environment of a subject vehicle. The system includes an environment recognizing unit configured to recognize a movable body which approaches the subject vehicle and recognize a form of a travel path on which the movable body travels; a speed correcting unit configured to correct a speed component of the movable body toward a roadside of the travel path, with a correction parameter in accordance with a relative distance between the subject vehicle and the movable body; and a collision determining unit configured to predict a behavior of the movable body based on a speed component of the movable body along the travel path and the speed component corrected with the correction parameter, and determine a possibility of collision between the movable body and the subject vehicle.

With the aspect, even when the detection accuracy for the movable body in the lateral direction is insufficient, proper drive assist can be provided by accurately predicting the behavior of the movable body and correctly determining the possibility of collision between the movable body and the subject vehicle.

BRIEF DESCRIPTION OF THE DRAWINGS

FIG. 7 is a flowchart showing processing of collision alert.

DESCRIPTION OF THE PREFERRED EMBODIMENT

Figure 1:
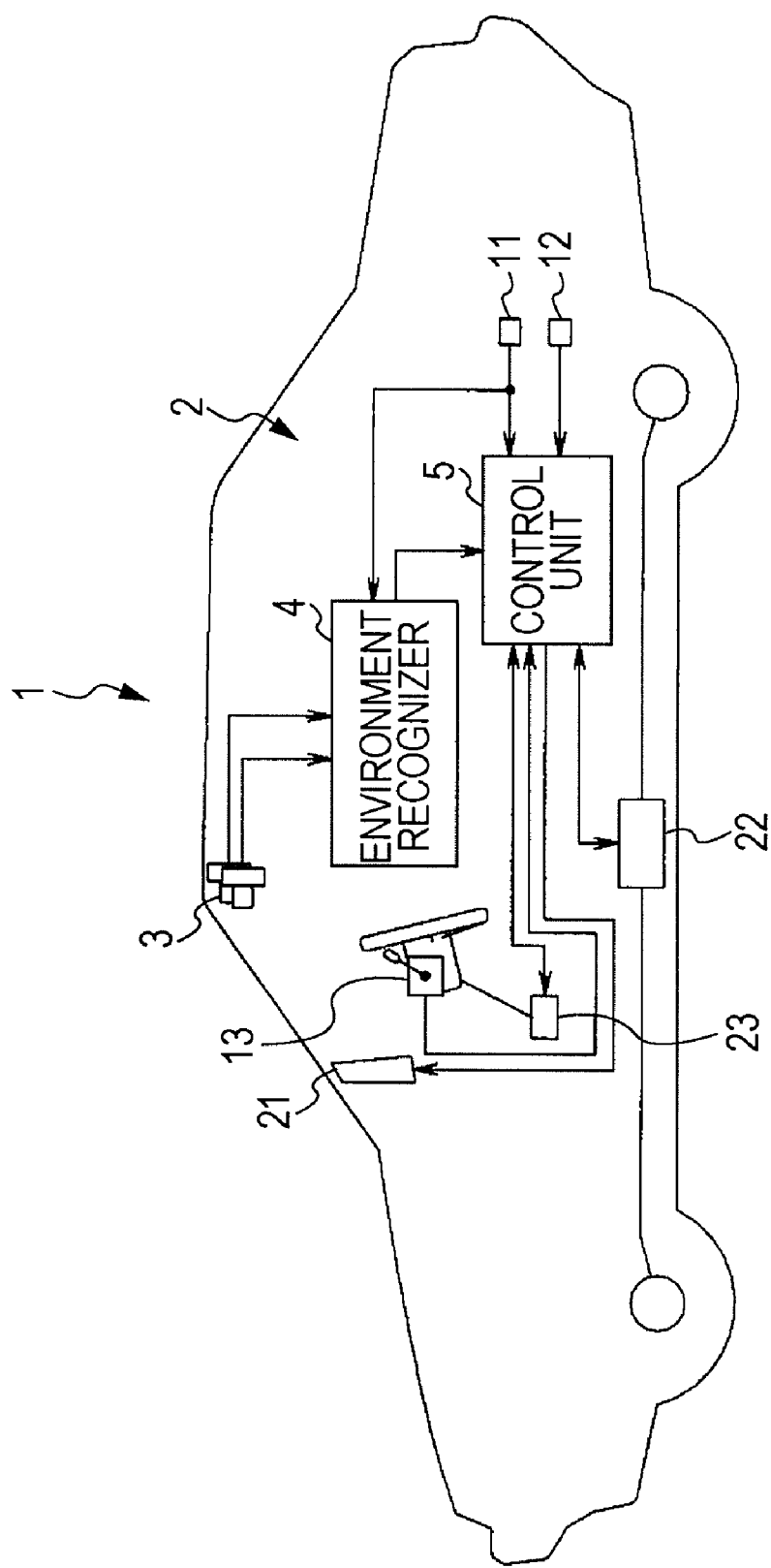
FIG. 1 is a configuration diagram briefly showing a drive assist system mounted on a vehicle.
Figure 2:
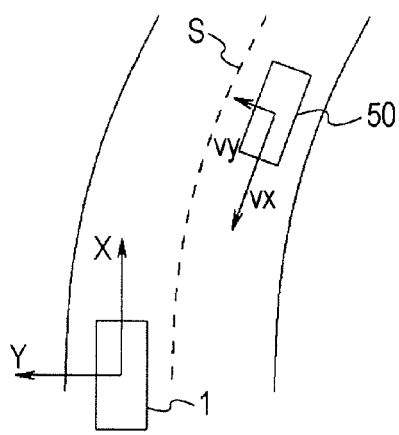
FIG. 2 is an explanatory view showing a speed component of an oncoming vehicle.
Figure 3:
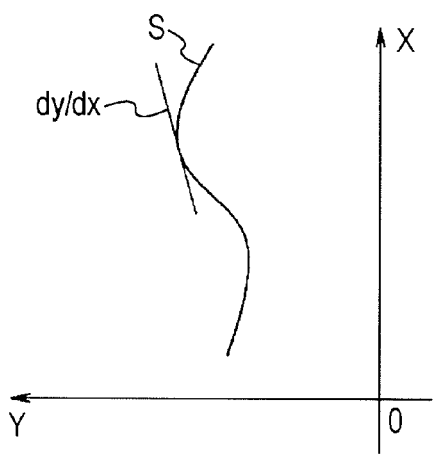
FIG. 3 is an explanatory view showing a speed in a lateral direction following a route.
Figure 4:
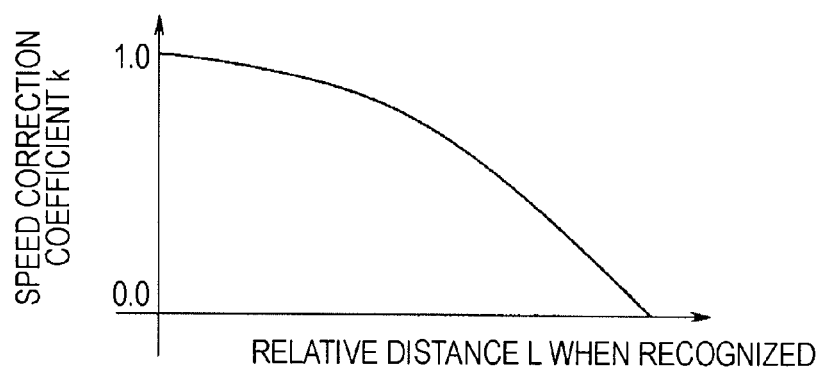
FIG. 4 is an explanatory view showing a speed correction coefficient.
Figure 5:
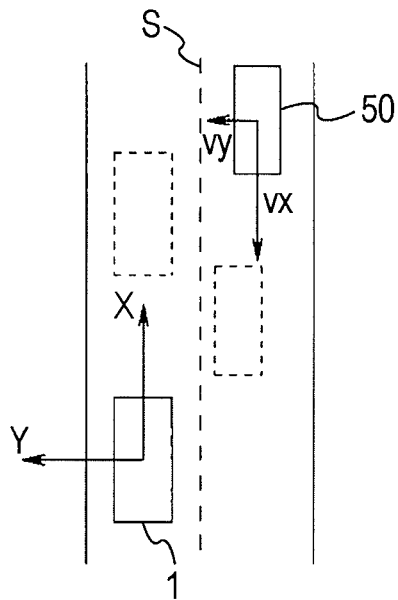
FIG. 5 is an explanatory view showing behavior prediction of an oncoming vehicle in a straight path.
Figure 6:
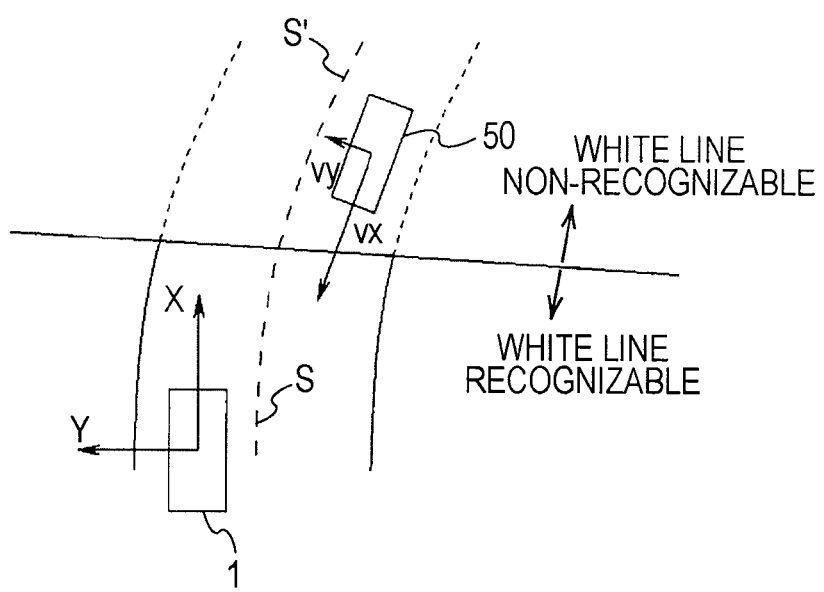
FIG. 6 is an explanatory view showing estimation of a travel path.

An embodiment of the present invention will now be described with reference to the drawings. FIGS. 1 through 7 relate to an embodiment of the present invention. FIG. 1 is a configuration diagram briefly showing a drive assist system mounted on a vehicle. FIG. 2 is an explanatory view showing a speed component of an oncoming vehicle. FIG. 3 is an explanatory view showing a speed in a lateral direction following a route. FIG. 4 is an explanatory view showing a speed correction coefficient. FIG. 5 is an explanatory view showing behavior prediction of an oncoming vehicle in a straight path. FIG. 6 is an explanatory view showing estimation of a travel path. FIG. 7 is a flowchart showing processing of collision alerting.

Referring to FIG. 1, a vehicle (subject vehicle) 1 is, for example, an automobile. A drive assist system 2 is mounted on the subject vehicle 1. The drive assist system 2 provides drive assist for a driver by recognizing external surrounding environment of the subject vehicle 1. In this embodiment, the drive assist system 2 includes a stereo camera 3, an environment recognizer 4, and a control unit 5 as primary portions. The stereo camera 3 serves as an environment recognizing sensor for recognizing surrounding environment of the subject vehicle 1, and captures an image outside the subject vehicle 1. The environment recognizer 4 serves as an environment recognizing unit for recognizing surrounding environment of the subject vehicle 1, by using image information from the stereo camera 3 as main information. The control unit 5 determines execution of drive assist for the driver based on the recognized result of the surrounding environment. The control unit 5 is connected with various devices relating to the drive assist, the devices including a display 21 also serving as an alarm device, an automatic brake control unit 22, and an automatic steering control unit 23.

The environment recognizer 4, the control unit 5, the automatic brake control unit 22, and the automatic steering control unit 23 each are formed of a control unit including a single or plurality of computer systems. The control units mutually exchange data through a communication bus.

The subject vehicle 1 is provided with a vehicle speed sensor 11 which detects a subject vehicle speed, a yaw rate sensor 12 which detects a yaw rate, and a main switch 13 to which an ON-OFF signal for drive system control is input. The subject vehicle speed is input to the environment recognizer 4 and the control unit 5. The yaw rate is input to the control unit 5. The ON-OFF signal for the drive assist control is input to the control unit 5.

The stereo camera 3 serving as the environment recognizing sensor includes a pair of (left and right) cameras using, for example, solid-state image devices, such as charge-coupled devices (CCDs) or complementary metal oxide semiconductors (CMOSs). The cameras are attached to a front portion of a ceiling of a vehicle cabin with a predetermined base-line length therebetween. The stereo cameras 3 stereographically capture images of objects outside the subject vehicle from different viewpoints, and inputs obtained image data to the environment recognizer 4.

The environment recognizer 4 includes an image processing engine for high-speed processing of an image captured with the stereo cameras 3. In addition, the environment recognizer 4 recognizes an obstruction, a front vehicle, lane markings (e.g. a white solid/broken line or a yellow line), and a roadside object when receiving input information such as map information from a navigation device (not shown).

The image processing with the stereo cameras 3 is performed by the environment recognizer 4 as follows. A pair of stereo images in a traveling direction of the subject vehicle 1 captured by the stereo cameras 3 are used to obtain distance information based on a shift between corresponding positions in the stereo images, and generates a distance image. The obtained data is processed by grouping etc., and compared with frames (windows) of previously stored three-dimensional road-form data, side-wall data, and three-dimensional object data. Then, white-line data, and data for a roadside object, such as a guardrail or a curb, are extracted. The three-dimensional object is sorted into a motorbike, a standard vehicle, a large-size vehicle, a pedestrian, and an electric pole, and the data is extracted.

In this embodiment, while the surrounding environment is recognized based on the stereo image, the surrounding environment may be recognized by using other recognizing sensor, such as a single-reflex camera, or millimeter wave radar.

The data is recognized as data in a coordinate system with reference to the subject vehicle, in which an origin is the subject vehicle 1, X axis is a front-rear direction of the subject vehicle 1, and Y axis is a width direction (lateral direction) of the subject vehicle 1. The white-line data, side-wall data, such as a guardrail or a curb extending along a road, and a type, a distance from the subject vehicle 1, a center position, a speed, etc., of the three-dimensional object are calculated. The speed of the three-dimensional object is calculated by time-differentiating a change over time of the position of the three-dimensional object. The environment recognizer 4 recognizes a movable body, such as an oncoming vehicle or a motorbike, moving toward the subject vehicle 1, recognizes a form of a travel path on which the movable body travels, and transmits the recognized result to the control unit 5.

The travel path of the movable body is acquired as lanes formed based on the white-line data when a white line is provided on a road, or lanes formed by dividing a road into two sections based on roadside object data, such as a guardrail, when no white line is provided or when a white line is non-recognizable at night. Alternatively, lanes based on map node information may be acquired as a travel path of a movable body.

The control unit 5 predicts a behavior of a movable body, such as an oncoming vehicle or a motorbike, moving toward the subject vehicle 1, and determines a possibility of collision against the subject vehicle 1, based on a subject vehicle speed V from the vehicle speed sensor 11, a yaw rate from the yaw rate sensor 12, and data from the environment recognizer 4. That is, the control unit 5 functions as a speed correcting unit which corrects a speed component of the movable body toward the roadside of the travel path (speed component toward an edge of a lane defined by a white line, a guardrail, a map node, etc.), and also functions as a collision determining unit which predicts the behavior of the movable body and determines the possibility of collision. Accordingly, the control unit 5 can highly accurately predict the behavior of the movable body even when a sensor (in this embodiment, stereo camera 3) for recognizing the surrounding environment has an insufficient detection accuracy in the lateral direction.

An example will be described in which, regarding a movable body moving toward the subject vehicle 1 as an oncoming vehicle, the form of the travel path on which the oncoming vehicle travels is recognized with the white line of the road, and the speed component of the oncoming vehicle with respect to the white line is corrected.

When an oncoming vehicle 50 at a front position of the subject vehicle 1 is recognized from stereo images and speed information of the oncoming vehicle 50 is acquired, the control unit 5 uses the acquired speed information of the oncoming vehicle 50 and calculates a speed component vy in a direction orthogonal to a route S (travel path) defined by a white line, as an actual observation value (speed component based on images from the stereo cameras 3). A speed component of the oncoming vehicle 50 in the front-rear direction and a virtual lateral speed component vy' of the oncoming vehicle 50 when the oncoming vehicle 50 travels along the route S, are calculated. A correction value vs is obtained by correcting the speed component vy as the actual observation value. Then, the possibility of collision is determined by predicting the behavior of the oncoming vehicle 50 in the lateral direction.

Referring to FIG. 2, the control unit 5 divides the speed information of the oncoming vehicle 50 into a speed component vx parallel to the route S and a speed component vy in a perpendicular direction orthogonal to the route S. The speed components vx, vy are actual observation values obtained by processing stereo images. To correctly determine the possibility of collision between the oncoming vehicle 50 and the subject vehicle 1, it is important to more correctly recognize the speed component vy in the perpendicular direction as compared with the speed component vx in the traveling direction. The speed component vy as the actual observation value in the direction orthogonal to the route S attains a sufficient accuracy when the oncoming vehicle 50 is located at a relatively small distance from the subject vehicle 1. However, when the oncoming vehicle 50 is located at a large distance from the subject vehicle 1, the accuracy may become insufficient. As the relative distance between the subject vehicle 1 and the oncoming vehicle 50 increases, an error increases.

On the other hand, the virtual lateral speed component vy' calculated based on the speed component of the oncoming vehicle in the front-rear direction and the route S is determined by assuming that the oncoming vehicle 50 travels along the route S as long as the traveling state is normal. When the relative distance between the subject vehicle 1 and the oncoming vehicle 50 is large (when the oncoming vehicle 50 is located far from the subject vehicle 1), the behavior of the oncoming vehicle 50 in the lateral direction can be recognized more accurately with the virtual speed component vy' than the case with the speed component vy of the actual observation value.

Thus, the control unit 5 highly accurately predicts the behavior of the oncoming vehicle 50 in the lateral direction by considering the virtual speed component vy' based on the route S and the speed component in the front-rear direction, in addition to the speed component vy of the actual observation value. Referring to FIG. 3, the virtual speed component vy' is calculated based on a change in the route S in the XY coordinate system with reference to the subject vehicle, and a speed component V of the oncoming vehicle 50 in the front-rear direction.

In particular, using an inclination dy/dx at a point of the route S and a speed component V (=dx/dt) of the oncoming vehicle 50 in the front-rear direction, the virtual speed component vy' is calculated by Equation (1) as follows, $$vy'=dy/dt=V \cdot dy/dx \qquad (1).$$

Then, a speed component vs directly toward the route S is calculated by weighting the speed component vy of the actual observation value and the virtual speed component vy' based on the route S and the speed component in the front-rear direction, with a speed correction coefficient k as a correction parameter set in accordance with a correction relative distance between the subject vehicle 1 and the oncoming vehicle 50, using Equation (2) as follows, $$vs=k \cdot vy+(1-k) \cdot vy' \qquad (2).$$

The speed correction coefficient k is set in accordance with a recognized error due to a resolution of the stereo cameras 3 in the lateral direction. For example, referring to FIG. 4, the speed correction coefficient k is set to approach 0 as the relative distance L between the subject vehicle 1 and the oncoming vehicle 50 when recognized increases. When the oncoming vehicle 50 is far, the speed correction coefficient k approaches 0. Hence, even when the accuracy of the speed component vy as the actual observation value obtained by processing the stereo images is insufficient, emphasis is placed on the virtual speed component vy' based on the route S and the speed component in the front-rear direction, and the speed component vs directly toward the route S is obtained. Accordingly, the behavior of the oncoming vehicle 50 can be highly accurately predicted.

When the oncoming vehicle 50 approaches the subject vehicle 1, the speed correction coefficient k approaches 1. Emphasis may be placed on the speed component of the actual measurement as compared with the virtual speed component vy' based on the route S and the speed component in the front-rear direction. Accordingly, a change in behavior of the oncoming vehicle 50 can be quickly and highly accurately recognized from the actual movement of the oncoming vehicle 50.

For example, in a case of traveling on a straight path shown in FIG. 5, the virtual speed component vy' based on the route S and the speed component of the oncoming vehicle 50 in the front-rear direction may be omitted. In particular, when a curvature of the route S is a predetermined threshold or smaller, a speed component vs with respect to the route S may be calculated by using Equation (2') in which a term for the speed component vy' is omitted from Equation (2) for facilitating the processing. The movement of the oncoming vehicle 50 toward the subject vehicle 1 as indicated by broken lines in FIG. 5 can be correctly predicted. Equation (2') is as follows, $$vs=k \cdot vy \qquad (2').$$

In the above-described processing, referring to FIG. 6, it may be difficult to recognize a white line at a position of the oncoming vehicle 50 although the oncoming vehicle 50 is recognizable from image information of the recognizing sensor (stereo cameras 3). In this case, a white line coordinate (route S) in a region with a white line currently being recognizable is approximated by using, for example, a polynomial, to extend the coordinate to the position of the oncoming vehicle 50. Hence, a route S' in a region with a white line being non-recognizable is determined.

Next, the control unit 5 predicts a change in behavior of the oncoming vehicle based on the speed component vx parallel to the route S and the speed component vs orthogonal to the route S, and determines a possibility of collision against the subject vehicle. When it is determined that collision is possible, the control unit 5 provides drive assist, for example, by outputting an alarm via the display 21, automatically braking via the automatic brake control unit 22, and controlling steering to avoid the collision via the automatic steering control unit 23. For example, the possibility of collision based on the change in behavior of the oncoming vehicle can be determined by evaluating a positional change in time series of the oncoming vehicle or a risk function set for the surrounding of the subject vehicle.

When the positional change in time series of the oncoming vehicle is used, curve approximation is applied to the positional change in time series of the oncoming vehicle based on the speed component vx parallel to the route S and the speed component vs orthogonal to the route S of the oncoming vehicle 50, to predict the travel path. When the travel path of the oncoming vehicle approaches and intersects with the travel path of the subject vehicle within a set range, it is determined that there is a possibility of collision.

When the risk function is set for the surrounding of the subject vehicle, functions are created for a risk for a white line of the subject vehicle and a risk for a three-dimensional object (oncoming vehicle) existing in the traveling direction of the subject vehicle based on the positions of the subject vehicle and the three-dimensional object. Both results are combined to obtain a total risk distribution in an XY coordinate while an origin is the subject vehicle. When the risk distribution exceeds a predetermined threshold, it is determined that there is a possibility of collision against the subject vehicle.

Now, an example of determining a possibility of collision against the oncoming vehicle and outputting a collision alarm will be described with program processing of alerting for collision shown in a flowchart of FIG. 7.

In the program processing, in step S101, a necessary parameter, in particular, various data such as white-line data, side-wall data of a guardrail or a curb extending along a road, and three-dimensional object data (e.g., type, distance from the subject vehicle, center position, and speed) is read.

Then, in step S102, a travel path form of the oncoming vehicle is recognized based on the white-line data. In step S103, a speed component vs of the oncoming vehicle orthogonal to the travel path (route) is calculated. The speed component vs is calculated by weighting a speed component vy of an actual observation value and a virtual speed component vy' when traveling along the route, with a speed correction coefficient k set in accordance with a relative distance between the subject vehicle and the oncoming vehicle, as described above with Equation (2).

When the current travel path is, for example, a straight path with a curvature of a threshold value or smaller, the lateral speed component vy' following the route does not have to be used, and the lateral speed component vy orthogonal to the route may be corrected with the speed correction coefficient k (refer to Equation (2')).

In step S104, a change in behavior of the oncoming vehicle is predicted based on the speed component vx parallel to the route S and the lateral speed component vs with respect to the route S of the oncoming vehicle. In step S105, it is determined whether there is a possibility of collision against the subject vehicle. Consequently, if it is determined that there is no possibility of collision between the subject vehicle and the oncoming vehicle, the processing exits from step S105. In contrast, if it is determined that there is a possibility of collision between the subject vehicle and the oncoming vehicle, the processing goes to step S106, in which an alarm is output by way of sound or image display through the display 21. After alerting is provided to the driver, the processing exits from the step.

As described above, in this embodiment, the travel path form of the movable body moving toward the subject vehicle is recognized, and the speed component toward the roadside of the travel path is corrected with the correction parameter in accordance with the relative distance between the subject vehicle and the movable body. Accordingly, even when the recognizing sensor has an insufficient resolution in the lateral direction, the change in behavior of the movable body in the lateral direction can be highly accurately predicted. Thus, the possibility of collision between the movable body and the subject vehicle can be correctly determined.

In addition, if it is difficult to correctly predict the behavior of the movable body in the lateral direction although the recognizing sensor has a high detection accuracy in the lateral direction, such as when traveling in a curve, the speed component with respect to the travel path of the movable body is corrected in accordance with the distance and the behavior of the oncoming vehicle is predicted. Accordingly, the possibility of collision between the movable body and the subject vehicle can be correctly determined, and proper drive assist can be provided without erroneous alerting or erroneous control.

What is claimed is:

1. A vehicle drive assist system which provides drive assist for a driver by recognizing surrounding environment of a subject vehicle, the system comprising:
    an environment recognizing unit configured to recognize a movable body which approaches the subject vehicle and recognize a form of a travel path on which the movable body travels;
    a speed correcting unit configured to correct a speed component of the movable body toward a roadside of the travel path in accordance with a correction parameter calculated based on a relative distance between the subject vehicle and the movable body; and
    a collision determining unit configured to predict a behavior of the movable body based on a speed component of the movable body along the travel path and the speed component toward the roadside of the travel path corrected based on the correction parameter, and determine a possibility of collision between the movable body and the subject vehicle.

2. The vehicle drive assist system according to claim 1, wherein the speed component toward the roadside of the travel path is a speed component orthogonal to the travel path.

3. The vehicle drive assist system according to claim 1, wherein the speed component toward the roadside of the travel path is corrected by adding a weight of the correction parameter to a virtual speed component generated when the movable body travels along the travel path, as a speed component based on an actual positional change of the movable body.

4. The vehicle drive assist system according to claim 1, wherein a correction amount for the speed component toward the roadside of the travel path is set to a large value when the movable body is located at a large distance from the subject vehicle, and the correction amount for the speed component toward the roadside of the travel path is set to a relatively small value when the movable body is located at a relatively small distance from the subject vehicle.

5. The vehicle drive assist system according to claim 1, wherein the form of the travel path is recognized based on image information of a white line of a road or a roadside object.

6. The vehicle drive assist system according to claim 5, wherein when a range of the travel path recognizable by the image information does not reach a position of the movable body, a currently recognizable travel path approximately extends to the position of the movable body.

7. The vehicle drive assist system according to claim 1, wherein the form of the travel path is recognized based on map information.

* * * * *